United States Patent Office 3,506,624
Patented Apr. 14, 1970

3,506,624
ELASTOMER COMPOSITIONS VULCANIZED WITH SULFUR, A SALT OF AN ORGANIC ACID, AND A MALEIMIDE COMPOUND
Rudolf Adolf Behrens, 215 Springbrook Trail, Sparta, N.J. 07871
No Drawing. Filed Mar. 11, 1968, Ser. No. 711,874
Int. Cl. C08d *13/28;* C08f *27/04, 27/07*
U.S. Cl. 260—78.4          10 Claims

ABSTRACT OF THE DISCLOSURE

Vulcanizable compositions comprising a mixture of a synthetic, vulcanizable elastomeric polymer, sulfur, an alkali metal salt, an organic carboxylic acid, and an N-substituted mono- or bis-maleimide of the formula:

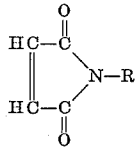

where R is a monovalent hydrocarbon radical or a divalent hydrocarbon radical having as a substituent on a terminal carbon atom a radical of the formula:

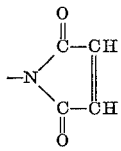

Typical of the elastomeric polymers are halogen-containing acrylate polymers, chloroprene polymers and epoxy-containing acrylate polymers. The new composition provides improved balance of vulcanization cure rate and processing safety (scorch time).

---

This invention relates to synthetic, vulcanizable elastomeric polymer compositions.

Copending application Ser. No. 568,374, filed July 28, 1966, which is a continuation-in-part of application Ser. No. 484,437, filed Sept. 1, 1965, describes a unique cure system for synthetic elastomeric compositions. The cure system is a mixture of sulfur and an alkali metal salt of an organic carboxylic acid and is sometimes termed the "soap and sulfur" curing system. As compared with conventional curing agents such as ammonium salts, alone or in combination with alkyl halides or alkaline earth metal oxides, the soap and sulfur system offers the advantages of better mold release, less corrosion of molds, better economy, freedom from offensive fumes and vapors, optional elimination of postcuring, and excellent bin stability.

The present invention is an improvement on the soap and sulfur cure system whereby processing safety (scorch time) is easily achieved without retarding the cure rate. Normally, if a rapid cure cycle in a particular application is desired, processing safety is sacrificed. Generally, neither adjusting the levels of sulfur and alkali metal salts nor changing the form of sulfur or alkali metal salt will completely overcome the problem.

It has been discovered that N-substituted mono- or bis-maleimides, particularly bis-maleimides, unexpectedly permit fast cure rate without adversely affecting processing safety. Otherwise stated, the present invention is an improvement on the soap and sulfur system in that the advantages of the soap and sulfur system are retained while additionally there is provided improved processing safety and good cure rate. The improved system, moreover, has been found to be adaptable to a range of cure rate and processing safety.

The synthetic elastomeric polymers vulcanized in accordance with the present invention comprise three classes of materials.

The first class comprises halogen-containing acrylate polymers. Typically, these polymers are copolymers of an alkyl acrylate, particularly a lower alkyl acrylate, and a minor proportion of a vinyl monomer containing the halogen. Chlorine is the most common halogen and will be used in this discussion as illustrative. The term "polymers" is, of course, inclusive of polymers containing two or more different monomers.

Perhaps the most wirely used and generally preferred elastomers of the acrylate type are copolymers of ethyl acrylate and varying amounts of a copolymerizable chlorine-containing monomer such as 2-chloroethyl vinyl ether, 2-chloroethyl acrylate, vinyl chloroacetate and the like. Particular examples of commercially available copolymers are those of ethyl acrylate and about five weight percent of chloroethyl vinyl ether, copolymers of ethyl acrylate and about five weight percent of 2-chloroethyl acrylate, and copolymers of about seventy weight percent or more of ethyl acrylate and up to fifteen weight percent of vinyl chloroacetate.

The second class of elastomeric polymers comprises chloroprene (neoprene) polymers. As used herein, the term "chloroprene polymers" includes not only the polymers of 2-chloro-1,3-butadiene but also copolymers thereof with polymerizable vinyl or diene compounds wherein chloroprene is the predominant monomer.

The third class of elastomeric polymers comprises epoxy-containing acrylate polymers, including both homopolymers and copolymers of one or more copolymerizable monomers.

Typical of these polymers are copolymers of a lower alkyl acrylate, such as ethyl acrylate, and glycidyl methacrylate.

The halogen and epoxy groups in the aforementioned polymers are sometimes described as "active" groups when referring to elastomeric polymers. The reason for this is that it is known in the art that polymers containing such groups are more readily vulcanized, thereby permitting vulcanization of specialty recipes not ordinarily easily vulcanizable. Such elastomers are of particular interest because of their outstanding resistance to deterioration due to heat. They perhaps have the best such properties of all commercial rubbers, except for some silicones and some highly fluorinated elastomers made for special applications. They are also highly resistant to flexural breakdown, compression set, ozone, ultraviolet light, mineral oils and gas diffusion. Consequently, they have been recommended for, and widely used in, gaskets, hose, conveyor belts, valve seals, packings, oil seals, printing rolls, protective coatings, and the like.

Particularly effective applications of the invention are in the vulcanization of copolymers of ethyl acrylate and vinyl chloroacetate (the product of copolymerizing about 5% of vinyl chloroacetate and 95% of ethyl acrylate) and terpolymers of butyl acrylate, vinyl chloroacetate and cyanoethyl acrylate.

In preparing the vulcanizable compositions of the invention, the unvulcanized elastomer is mixed with sulfur, an alkali metal salt of an organic acid, a maleimide, and other conventional additives as desired. The compounding can be done on a rubber mill by standard procedures. The compounded rubber is then cured at an elevated temperature, as in a heated mold.

The maleimides are N-substituted mono- or bis-maleimides of the formula:

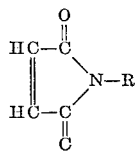

where R is a monovalent or divalent, substituted or unsubstituted, hydrocarbon radical. When divalent, the hydrocarbon radical has as a substituent on its terminal carbon atom a radical of the formula:

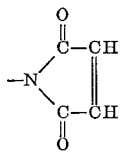

Typical hydrocarbon radicals are the monovalent or divalent residues of aryl groups such as phenyl or naphthyl, alkyl groups such as lower alkyl, and cycloalkyl groups such as cyclohexyl. Typical substituents on the hydrocarbon radical are nitro, lower alkyl, lower alkoxy, halo(chloro, bromo, iodo), phenyl, phenoxy, and the like.

Among the bis-maleimides useful in the present invention are N,N'-ethylene bis maleimide, N,N'-hexamethylenebis maleimide, tolylene-2,4-bis maleimide, tolylene-2,6-bis maleimide, phenylene-1,4-bis maleimide, phenylene-1,3-bis maleimide, N',N-(methylenedi-p-phenylene) dimaleimide, and the like, including mixtures thereof. Preferred is a mixture of tolylene-2,4- and -2,6-bis maleimide.

Monomaleimides are also useful, although the bismaleimides are preferred. Examples of monomaleimides useful in the present invention are N-phenylmaleimide, N-(o-tolyl)maleimide, N-(m-tolyl)maleimide, N-(o-nitrophenyl)maleimide, N-(m-nitrophenyl)maleimide, N-(p-nitrophenyl)maleimide, N-(p-ethoxyphenyl)maleimide, N-alpha-naphthyl maleimide, N-(2-ethylhexyl)maleimide, and the like.

The maleimides useful in the invention including the above specific compounds are known products and are disclosed, for example, in U.S. Patent 2,444,536; 2,462,835; and 2,980,694.

The amount of maleimide used in conjunction with sulfur and alkali metal carboxylate in the vulcanization system of this invention may vary over a wide range, depending on the particular application for which the system is designed. Normally, however, the maleimide will be used in a range of from about 0.25 to about 5.0 parts, by weight, per hundred parts of the elastomer, preferably from about 0.5 to about 1.5 parts per hundred. Generally, as the amount of maleimide is increased, the rate of cure and level of cure are increased with at most only a very slight decrease in the processing safety (scorch), the amount of sulfur and alkali metal salt remaining constant. However, it has aslo been noted that slight adjustments in the amounts of sulfur and/or alkali metal salt will enable the user to improve processing safety markedly.

The amount of sulfur used should be between about 0.05 and 2.5 parts per hundred of elastomer, preferably between about 0.1 and 0.5 part per hundred. The effect of increasing the sulfur level is to reduce the processing safety and to increase the rate and level of cure.

The alkali metal salts which may be used include the sodium, potassium and lithium salts of mono- and poly- basic, saturated and unsaturated organic acids, such as fatty acids of 1–18 carbon atoms, unsaturated aliphatic acids of 3–18 carbon atoms, saturated aliphatic dicarboxylic acids, aryl carboxylic acids, and the like. Representative salts include sodium stearate, potassium stearate, sodium acetate, potassium sodium tartrate, sodium oleate, and combinations thereof. The preferred salts are the $C_8$ and $C_{18}$ fatty acid salts and sodium is the preferred metal. Potassium salts tend to produce faster cure rates than the sodium salts.

The amount of alkali metal salt used will be in the range of about 0.5 to about 7.0 parts per hundred parts of elastomer, preferably between 0.1 and 5.0 parts per hundred. Increased amount of salt has an effect similar to increased usage of sulfur, i.e., reduced processing safety, faster rate and higher level of cure.

As already mentioned, manipulation of sulfur and alkali metal salt alone will not permit a higher rate of cure and a higher level of cure without a resultant decrease in the processing safety. The effect of adding a maleimide to the vulcanizable composition of elastomer, sulfur and alkali metal carboxylate is a dramatic increase in the rate of cure and a higher level of cure with only slight, if any, effect on the processing safety. This effect is unusual and quite unexpected and for the first time provides a safe and controlled vulcanization system for the various active halogen-containing and other elastomers described above.

Additives normally used in compounding elastomers may be added at the time of compounding the elastomer. These additives include carbon black, other fillers, pigments, antioxidants, stabilizers, and other conventional materials.

The compounded elastomers are vulcanized by standard procedures. Curing temperatures above 150° C. are normally employed.

The following examples further illustrate the invention but are not intended to be limitative. Parts and percentages are by weight unless otherwise indicated.

EXAMPLE 1

An elastomer was prepared from ethyl acrylate and vinyl chloroacetate at a monomer ratio of 95/5. The elastomer contained about 1% chlorine. This elastomer is designated "copolymer" in the following Table I. In a similar way an elastomer was prepared from butyl acrylate, cyanoethyl acrylate and vinyl chloroacetate with a monomer ratio of 83/12/5. This elastomer container about 1% chlorine and is designated "terpolymer" in Table I. These elastomers were then compounded into the compositions shown in Table I. The compositions were then vulcanized under the conditions shown in Table II and tested. The vulcanizate properties are also shown in Table II. Mooney scorch data are shown as $T_5$, which represents the time in minutes for a 5-point increase in the Mooney viscosity from the minimum viscosity at the temperature of measurement. The data show that the elastomers compositions (compounds B, C and E) and process of this invention produce a faster rate of cure and a higher level of cure with greater processing safety.

TABLE I.—FORMULATION OF ACRYLIC ELASTOMER WITH BIS MALEIMIDES

|  | A | B | C | D | E |
|---|---|---|---|---|---|
| Copolymer | 100 | 100 | 100 | 50 | 50 |
| Terpolymer |  |  |  | 50 | 50 |
| FEF [1] Carbon black | 60 | 60 | 60 | 65 | 65 |
| MT [2] Carbon black |  |  |  | 35 | 35 |
| Agerite white [3] | 2.0 | 2.0 | 2.0 |  |  |
| BLE [4] |  |  |  | 2.0 | 2.0 |
| Stearic acid | 2.0 | 2.0 | 2.0 | 2.0 | 2.0 |
| Sulfur | 0.3 | 0.3 | 0.3 | 0.3 | 0.3 |
| Sodium oleate | 3.5 | 3.5 | 3.5 | 3.5 | 3.5 |
| Tolylene-2,4-bis maleimide |  |  | 1.5 |  |  |
| Phenylene-1,3-bis maleimide |  | 1.5 |  |  | 1.5 |

[1] Fast extruding furnace.
[2] Medium thermal.
[3] Di-beta-naphthyl-p-phenylene diamine.
[4] Acetone diphenyl amine condensation product.

TABLE II.—VULCANIZATE PROPERTIES OF BIS MALEIMIDE CURED ACRYLATES

|  | Original | | | | | Post Cured 16 Hrs. at 300° F. | | | | |
|---|---|---|---|---|---|---|---|---|---|---|
|  | A | B | C | D | E | A | B | C | D | E |
| Mooney Scorch at 250° F., $T_5$ | 37.5 | 35.2 | 48.4 | 20.2 | 25.5 | | | | | |
| Mooney Scorch at 330° F., $T_5$ | 3.3 | 3.1 | 3.2 | 2.0 | 1.8 | | | | | |
| Stress-strain Properties, Compounds Cured at 330° F., Modulus, 100% after: | | | | | | | | | | |
| 5 minutes | 180 | 290 | 230 | 250 | 450 | | | | | |
| 10 minutes | 290 | 670 | 500 | 590 | 890 | 770 | 1,040 | 1,070 | 1,330 | |
| 15 minutes | 460 | 810 | 780 | 800 | 990 | 870 | 1,100 | 1,140 | | |
| Tensile after: | | | | | | | | | | |
| 5 minutes | 230 | 460 | 360 | 300 | 525 | | | | | |
| 10 minutes | 1,180 | 1,725 | 1,510 | 900 | 950 | 1,630 | 1,950 | 1,960 | 1,330 | 1,220 |
| 15 minutes | 1,470 | 1,825 | 1,760 | 1,030 | 1,040 | 1,880 | 2,030 | 2,000 | 1,475 | 1,250 |
| Elongation, percent after: | | | | | | | | | | |
| 5 minutes | 930 | 585 | 860 | 550 | 310 | | | | | |
| 10 minutes | 555 | 290 | 330 | 260 | 140 | 215 | 195 | 180 | 100 | 85 |
| 15 minutes | 400 | 250 | 250 | 180 | 120 | 220 | 190 | 170 | 90 | 80 |
| Hardness, Shore A after: | | | | | | | | | | |
| 5 minutes | 60 | 66 | 64 | 69 | 78 | | | | | |
| 10 minutes | 63 | 75 | 72 | 75 | 85 | 71 | 80 | 80 | 85 | |
| 15 minutes | 65 | 75 | 75 | 77 | 85 | 74 | 81 | 80 | 87 | |
| Compression set, percent[1] | | | | | | 28.2 | 28.6 | 29.3 | 35.9 | 38.3 |

[1] On samples first cured for 17 minutes at 330° F. post cured for 16 hours at 300° F. and then air aged for 70 hrs. at 330° F. under 25% compression.

EXAMPLE 2

Two samples of the terpolymer elastomer of Example 1 were compounded, vulcanized and tested with the results shown in Table III. The data compare the best vulcanization system using sulfur and alkali metal salt (F) with the vulcanization system of this invention (G). It can be readily seen that the processing safety of (G) is considerably better than (F) at similar rate and level of cure.

TABLE III

| Formulation | F [1] | G [2] |
|---|---|---|
| Terpolymer of Example 1 | 100 | 100 |
| FEF Carbon black | 70 | 70 |
| MT Carbon black | 10 | 10 |
| Stearic acid | 2 | 2 |
| Phenyl beta-naphthylamine | 2 | 2 |
| Sulfur | 0.3 | 0.3 |
| Sodium oleate | 4 | 3.5 |
| Potassium stearate | 0.5 | |
| Phenylene-1,3-bis maleimide | | 1 |
| Mooney Scorch: | | |
| 250° F., $T_5$ | 10 | 43.5 |
| 330° F., $T_5$ | 1.2 | 2.3 |
| Stress-strain properties, cured 330° F., Modulus, 100%, p.s.i., after: | | |
| 3 minutes | 170 | 170 |
| 6 minutes | 360 | 380 |
| 10 minutes | 630 | 545 |
| Tensile, p.s.i., after: | | |
| 3 minutes | 560 | 270 |
| 6 minutes | 920 | 790 |
| 10 minutes | 1,125 | 960 |
| Elongation, percent, after: | | |
| 3 minutes | 500 | 520 |
| 6 minutes | 320 | 300 |
| 10 minutes | 200 | 210 |
| Hardness, Shore A, after: | | |
| 3 minutes | 64 | 68 |
| 6 minutes | 64 | 72 |
| 10 minutes | 69 | 75 |

[1] F, one-stage mix, dumped at 220° F.
[2] G, two stage mix.

EXAMPLE 3

The data of Table IV below show that composition A containing N-phenylmaleimide provides better scorch protection, a higher state of cure with a similar cure rate, and lower compression set as compared to elastomer B which lacks the mono maleimide.

TABLE IV

| Formulation of acrylic elastomers with monomaleimides | Parts by weight | |
|---|---|---|
|  | A | B |
| Elastomer copolymers of Example 1 | 100 | 100 |
| FEF [1] carbon black | 60 | 60 |
| Phenyl-beta-naphthylamine | 2 | 2 |
| Stearic acid | 1 | 1 |
| Sulfur | 0.3 | 0.3 |
| Sodium stearate | 3.5 | 3.5 |
| N-phenylmaleimide | 1.5 | |
| Mooney Scorch, $T_5$ at 270° F. | 19.4 | 12.8 |
| Stress-strain properties, cured 5 minutes at 330° F.: | | |
| 100% modulus, p.s.i. | 200 | 200 |
| Tensile, p.s.i. | 260 | 220 |
| Elongation, percent | 850 | 980 |
| Shore A hardness | 64 | 62 |
| Post Cured for 4 hours at 350° F.: | | |
| 100% modulus, p.s.i. | 735 | 560 |
| Tensile, p.s.i. | 1,675 | 1,410 |
| Elongation, percent | 260 | 270 |
| Shore A hardness | 70 | 66 |
| Compression set, percent [2] | 31.5 | 41.0 |

[1] Fast extruding furnace.
[2] On samples first cured 6 minutes at 330° F., post cured 4 hours at 350° F., and then air aged for 70 hours at 300° F. under 25% compression.

EXAMPLE 4

Table V below shows the further enhancement of a soap and sulfur cure of an epoxy-containing acrylate polymer. Thus, composition A shows the properties obtained on this polymer using only soap and sulfur. Compositions B and C show the enhancement of properties after 10 minutes cure at 330° F. (refer to 100% modulus) when 0.75 and 1.5 parts of tolylene bismaleimide are added to the cure system. Composition D is a typical soap and sulfur cure of halogen-containing acrylate elastomer for comparison. It can therefore be concluded that bismaleimides enhance the soap and sulfur vulcanization of epoxy containing elastomers.

TABLE V

|  | A | B | C | D |
|---|---|---|---|---|
| Elastomer [1] | | | | 100 |
| Elastomer [2] | 100 | 100 | 100 | |
| Carbon black (FEF) | 60 | 60 | 60 | 60 |
| Stearic acid | 1 | 1 | 1 | 1 |
| PBNA [3] | 2 | 2 | 2 | 2 |
| Sulfur | 0.3 | 0.3 | 0.3 | 0.3 |
| Sodium oleate | 3.5 | 3.5 | 3.5 | 3.5 |
| Toluene-2,4-bismaleimide | | 0.75 | 1.5 | |
| Mooney Scorch at 270° F., $T_5$ | 10.5 | 9.4 | 6.0 | 6.7 |
| Stress-strain properties, cured at 330° F., 100% Modulus: | | | | |
| 5 minutes | 210 | 330 | 365 | 490 |
| 10 minutes | 240 | 425 | 445 | 750 |
| Tensile, p.s.i.: | | | | |
| 5 minutes | 150 | 530 | 510 | 1,500 |
| 10 minutes | 605 | 960 | 830 | 1,650 |
| Elongation, percent: | | | | |
| 5 minutes | 900 | 470 | 390 | 380 |
| 10 minutes | 590 | 375 | 330 | 230 |
| Shore A Hardness: | | | | |
| 5 minutes | 59 | 69 | 71 | 65 |
| 10 minutes | 60 | 70 | 68 | 73 |
| Post cured 4 hours at 176° C.: | | | | |
| 100% modulus, p.s.i. | 1,130 | 1,210 | 1,260 | 1,200 |
| Tensile, p.s.i. | 1,700 | 1,760 | 1,775 | 1,925 |
| Elongation, percent | 150 | 150 | 160 | 185 |
| Shore A hardness | 75 | 76 | 81 | 72 |

[1] Ethylacrylate, vinyl chloroacetate copolymer.
[2] 97.5% ethylacrylate, 2.5% glycidyl methacrylate.
[3] Phenyl-β-naphthylamine.

EXAMPLE 5

Substantially in accordance with the procedures of Examples 1–4, a chloroprene polymer ("Neoprene W"—available from E. I. du Pont de Nemours and Company) was cured with a soap, sulfur and an N-substituted maleimide as set forth in Table VI. The data shows a high state of cure and good scorch time.

TABLE VI

| | A | B | C | D |
|---|---|---|---|---|
| Chloroprene elastomer | 100 | 100 | 100 | 100 |
| Stearic acid | 1 | 1 | 1 | 1 |
| Phenyl-β-naphthylamine | 2 | 2 | 2 | 2 |
| SRF carbon black | 29 | 29 | 29 | 29 |
| Sulfur | | 1 | 1 | 1 |
| Potassium stearate | | 2 | 2 | 2 |
| M-phenylene bismaleimide | | 2 | 2 | 2 |
| Magnesium oxide | 3 | 3 | 3 | |
| Zinc oxide | 5 | 5 | | |
| 2-mercaptoimidazoline | 0.4 | | | |
| Mooney Scorch T$_5$, 270° F | 2.7 | 3.5 | 3.3 | 6.7 |
| Stress-strain: | | | | |
| Cure temp., °F | 307 | 307 | 307 | 307 |
| Cure time, min | 20/40 | 20/40 | 20/40 | 20/40 |
| 300% modulus (p.s.i.) | 1,230/1,300 | 980/1,050 | 670/830 | 550/600 |
| Tensile, p.s.i. | 3,130/3,200 | 2,600/2,750 | 2,350/2,800 | 2,330/2,580 |
| Elongation, percent | 600/600 | 700/700 | 800/800 | 810/830 |
| Hardness (Shore A) | 62/64 | 62/64 | 61/64 | 57/57 |

I claim:

1. A vulcanizable composition comprising a mixture of (1) an elastomer selected from the group consisting of halogen-containing acrylate polymers, chloroprene polymers and epoxy-containing acrylate polymers, (2) about 0.05 to about 2.5 parts of sulfur, (3) about 0.5 to about 7 parts of an alkali metal salt of an organic carboxylic acid, and (4) about 0.25 to about 5 parts of an N-substituted maleimide, per 100 parts of elastomer, wherein said maleimide has the formula:

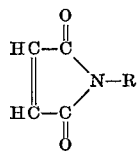

where R is (a) a substituted or unsubstituted monovalent hydrocarbon radical or (b) a substituted or unsubstituted divalent hydrocarbon radical having as a substituent on a terminal carbon atom a radical of the formula:

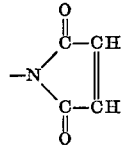

2. The composition of claim 1 wherein the elastomer is a copolymer of an alkyl acrylate and vinyl chloroacetate.

3. The composition of claim 1 wherein the elastomer is a terpolymer of a lower alkyl acrylate, cyanoethyl acrylate and vinyl chloroacetate.

4. The composition of claim 1 where said N-substituted maleimide is phenylene-1,3-bis maleimide.

5. The composition of claim 1 wherein said N-substituted maleimide is tolylene-2,4-bis maleimide.

6. The composition of claim 1 wherein said N-substituted maleimide is N-phenylmaleimide.

7. A vulcanization process which comprises heating the mixture of claim 1 until vulcanization is substantially complete.

8. A vulcanization process which comprises heating the mixture of claim 3 until vulcanization is substantially complete.

9. The vulcanized product prepared by the process of claim 7.

10. The vulcanized product prepared by the process of claim 8.

References Cited

UNITED STATES PATENTS

| 2,989,504 | 6/1961 | Little | 260—62 |
| 3,153,014 | 10/1964 | Fletcher et al. | 260——78 |
| 3,244,774 | 4/1966 | Kaupp et al. | 260—897 |
| 3,324,088 | 6/1967 | Waldron | 260—79.3 |

JOSEPH L. SCHOFER, Primary Examiner

J. KIGHT III, Assistant Examiner

U.S. Cl. X.R.

260—2, 23, 23.7, 78, 79.5, 78.5, 80.76, 80.81, 82.1, 85.3, 85.7, 86.1, 41, 41.5

UNITED STATES PATENT OFFICE
CERTIFICATE OF CORRECTION

Patent No. 3,506,624　　　　　　　　　　Dated April 14, 1970

Inventor(s) Rudolf Adolf Behrens

It is certified that error appears in the above-identified patent and that said Letters Patent are hereby corrected as shown below:

Table II, Column E, second line from bottom, unable to read 91, third line from bottom, unable to read 90 as appears on page 9 of the original specification.

SIGNED AND SEALED
DEC 15 1970

(SEAL)
Attest:

Edward M. Fletcher, Jr.
Attesting Officer

WILLIAM E. SCHUYLER, JR.
Commissioner of Patents